United States Patent [19]

Rivman et al.

[11] 3,940,307
[45] Feb. 24, 1976

[54] APPARATUS FOR SECURING ARTICLES TO FILM-LIKE MATERIAL

[75] Inventors: Samuel J. Rivman, White Plains; Alvaro Da Costa, Garnerville, both of N.Y.

[73] Assignee: Eastern Poly Packaging Company, Brooklyn, N.Y.

[22] Filed: Feb. 19, 1974

[21] Appl. No.: 443,653

Related U.S. Application Data

[62] Division of Ser. No. 306,109, Nov. 13, 1972.

[52] U.S. Cl. .................. 156/514; 83/491; 156/261; 156/518; 156/530; 156/538; 156/552
[51] Int. Cl.² .......................................... B32B 31/00
[58] Field of Search ....... 156/91, 92, 229, 251, 252, 156/261, 262, 264, 272, 513, 514, 515, 517, 518, 293, 423, 494, 530, 538, 552, 566; 83/18, 111, 471.2, 199, 483, 491

[56] References Cited
UNITED STATES PATENTS

| | | | |
|---|---|---|---|
| 3,351,963 | 11/1967 | Rapisarda | 156/514 |
| 3,389,643 | 6/1968 | Lemeke et al. | 156/513 |
| 3,392,077 | 7/1968 | Brieske et al. | 156/513 |
| 3,423,271 | 1/1969 | Kallert et al. | 156/513 |
| 3,783,080 | 1/1974 | Goglio | 156/514 |

*Primary Examiner*—Caleb Weston
*Attorney, Agent, or Firm*—Hubbell, Cohen & Stiefel

[57] ABSTRACT

This invention is a method and apparatus for securing snap fasteners to supporting material. An aperture is formed in the supporting material and the socket or stud of the fastener, as the case may be, is allowed to project through the aperture. The supporting material is then heat sealed to the fastener around the aperture. Preferably, both the supporting material and the snap fasteners are made of heatsealable, thermoplastic material.

10 Claims, 12 Drawing Figures

APPARATUS FOR SECURING ARTICLES TO FILM-LIKE MATERIAL

This is a division, of application Ser. No. 306,109, filed Nov. 13, 1972.

FIELD OF THE INVENTION

This invention relates to a method and apparatus for securing articles to film-like material; and, in particular, to a method and apparatus for securing snap fasteners to a supporting material. The present invention may be used quite suitably for attaching thermoplastic snap fasteners to plastic material being made into bags.

BACKGROUND OF THE INVENTION

Heretofore, the major portion of all plastic snap fasteners were secured or sealed to a substrate or supporting material on their bottom surfaces with their stud or socket members projecting upwardly. Thus, the snap fastener was entirely on one side of the material. An example of this type of fastener is shown in FIG. 35 of U.S. Pat. No. 3,049,462 issued to N. M. Barlow et al on Aug. 14, 1962. The Barlow et al patent also discloses an apparatus for attaching such snap fasteners to the supporting material.

Snap fasteners which penetrate the supporting material are usually made of metals such as those shown in U.S. Pat. No. 3,192,200 issued to D. J. Dadddona, Jr. on July 20, 1965; but, recently plastic snap fasteners which are adapted to penetrate the supporting material and be secured therein have been developed. Representative of the latter type of snap fastener is the type shown in U.S. Pat. No. 3,553,796 issued to A. E. Carlile on Jan. 12, 1971.

The first mentioned snap fasteners which are secured entirely on one side of the material by adhesive or by a heat seal too often are easily pulled off or removed from the supporting material. Accordingly, it is an object of the present invention to provide a method and apparatus for securely sealing snap fasteners to their supporting material.

The second mentioned snap fasteners which must penetrate the material suffer from the disadvantage that the snap fastener is usually composed of at least four separate elements and, in some events, as many as five penetrations of the supporting film is necessary. Applying these fasteners to the supporting film is not only slow but the many penetrations of the supporting film tend to readily initiate tears. Accordingly, it is another object of the present invention to secure a snap fastener to film-like material with only one penetration of the film.

It is a still further object of the present invention to provide a method and apparatus to speedily and automatically apply thermoplastic snap fasteners to thermoplastic film material. The aforementioned and other objects and advantages of the present invention will become obvious to those skilled in the art from the following Summary of the Invention, Drawings, and Description of the Preferred Embodiment.

SUMMARY OF THE INVENTION

In its broadest aspect, the present invention is a method and apparatus for forming an aperture in film-like material and securing said material to an article by a seal made at least partially around said aperture. The method includes the steps of positioning the fim over the article; stretching the film across a portion of the article which, preferably, is a projection such as a stud or socket of a snap fastener; forming an aperture in the stretched portion of the film; and sealing the film to the article at least partially around the aperture.

The apparatus of the present invention includes means for stretching the film across a portion of the article; means for forming an aperture in the film while it is so stretched; and means for heat sealing the film to the article at least partially around the aperture.

In a narrower aspect, the present invention is an apparatus for heat sealing a snap fastener to supporting film-like material which includes a housing; a tubular knife resiliently mounted in the housing so that its cutting tip extends below the housing; means for rotating the knife; and, heat sealing means affixed to the bottom of said housing which at least partially encircle the cutting tip. In a more limited aspect, the present invention includes, in addition to the foregoing recited elements, a cam driven rocker arm for raising and lowering the housing, a cam driven plunger and feed track for delivering the fasteners to a nest positioned below the houing; and vacuum means acting through the hollow tubular knife to remove the slugs of film resulting from the forming of the aperture in the film material. The foregoing features of the present invention may be better appreciated from the drawings which are described below.

DESCRIPTION OF THE DRAWINGS

In the drawings which are attached hereto and made a part of this disclosure.

DESCRIPTION OF THE PREFERRED EMBODIMENT

Figure 1:
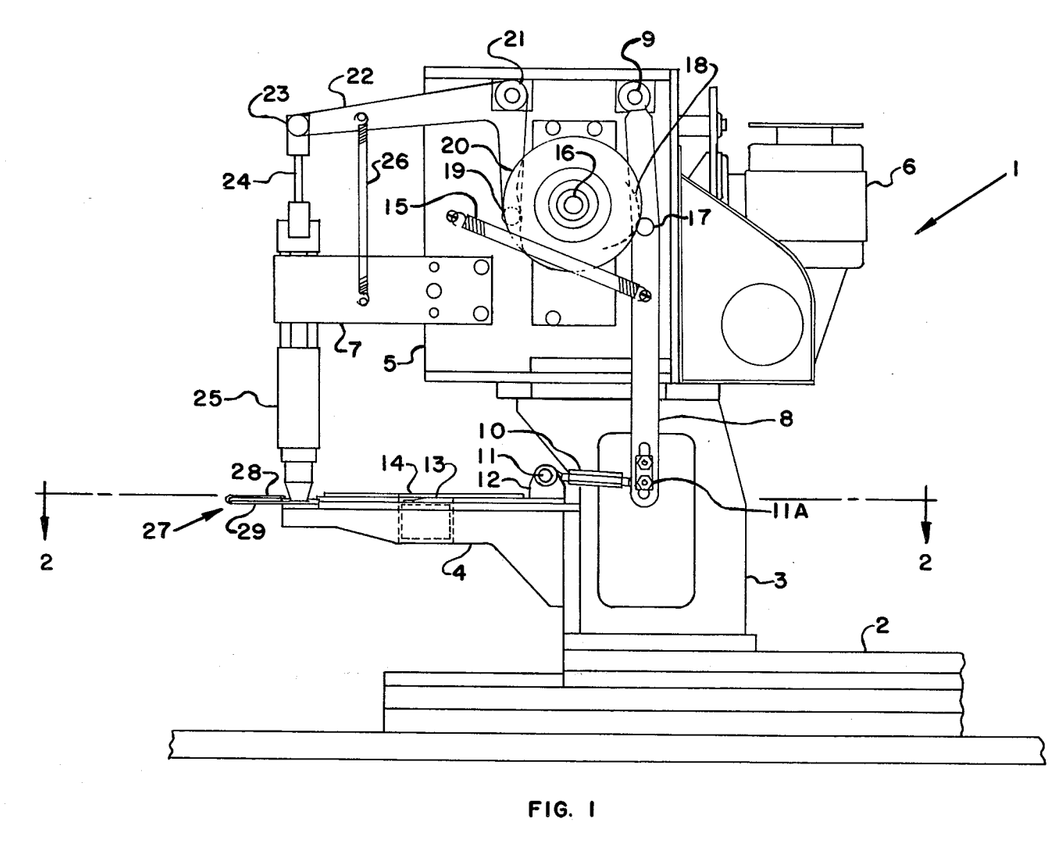
FIG. 1 is a side elevation view in partial section of the preferred embodiment of the apparatus of the present invention.

The method and the general operation of the preferred embodiment of the present invention will be described first with reference to FIGS. 1, 2, and 3. Looking at FIG. 1, the apparatus 1 is shown resting on support platform or base 2 from which rises upright supporting member 3 having arm 4 cantileverly mounted to provide a working surface. To the top of supporting member 3 upright supporting plate 5 is attached and from which horizontal support plate 7 extends. To the rear of the apparatus 1, motor 6 is mounted and to the left of motor 6, driving arm 8 is mounted by pivot 9 at one end thereof and is connected to connecting rod 10 through rod pivot 11a. Rod 10 is, in turn, connected to connecting plate 12 through pivot 11. Connecting plate 12 is affixed to plunger 13 for advancing snap fasteners 14 as will be described hereinafter. Plunger 13 moves in linear motion in plunger track 30 (see FIG. 2) and the motion is provided by driven cam shaft 16 which rotates cam 18 whose partial shadow line is shown. As the cam shaft 16 rotates, the first cam or driving arm cam 18 acts upon the first cam follower or driving arm cam follower 17 which is located intermediate the length of driving arm 8 to move the arm backward to its extreme rearward position which is shown in FIG. 1. Further rotation of cam shaft 16 and, hence, first cam 18, relaxes the cam driving force on arm 18; but the arm is urged forward by the influence of driving arm spring 15. Thus, spring 15 acting through arm 8 urges the plunger 13 forward to move or to deliver a snap fastener to its working position 14a as shown in FIG. 2.

Still referring to FIG. 1, sealing and severing head assembly 25 is shown carried by the head drive connecting rod assembly means 24 which is journaled in horizontal support plate 7. The connecting assembly means 24 is connected to rocker arm 22 by pivot 23. Rocker arm 22 is supported by pivot 21 and at its extremity opposite pivot 23 there is located the rocker arm cam follower or second cam follower 19 which follows cam surface 20 shown partially in dotted line in FIG. 1. Rocker arm spring 26 applies force to keep cam follower 19 in contact with cam surface 20. In the position shown in FIG. 1, the head assembly 25 is in its lower-most position. Further rotation of cam shaft 16 will cause the rocker arm to raise head assembly 25; and, conversely, spring 26 urges head assembly 25 downward to its lowermost position. Thus, the vertical reciprocal movement for the head assembly 25 is provided through the rocker arm 22 and cam shaft 16.

The cam surfaces 18 and 20 are so disposed on cam shaft 16 as to ensure that head assembly 25 is in an up position when plunger 13 is withdrawn to pick up another fastener 14. As stated above, in the position shown in FIG. 1 plunger 13 is withdrawn its full stroke and head assembly 25 has descended to its full stroke. The timing and arrangement of the cams to accomplish this repeating sequential operation is well within the ordinary skill of the art.

Figure 2:
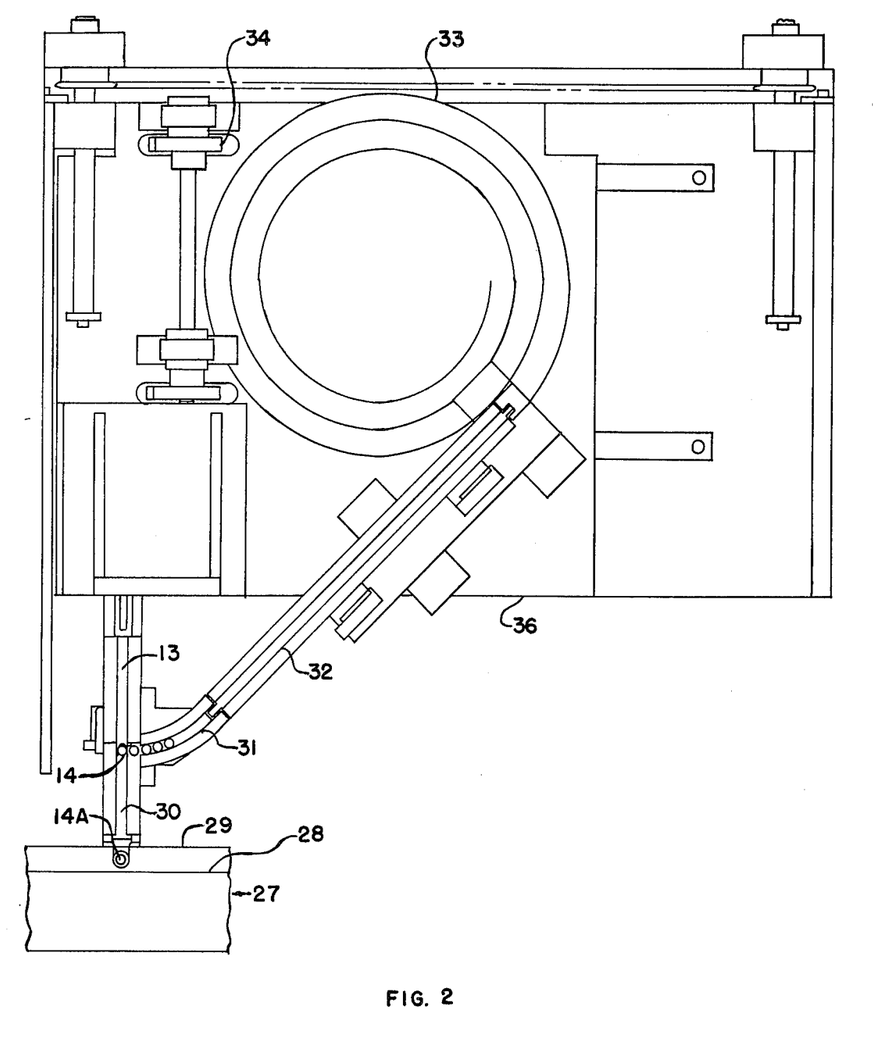
FIG. 2 is a layout or plan view looking along section line 2—2 of FIG. 1 and shows the righthand portion of said section, the lefthand section being a mirror image of what is shown in FIG. 2.

Turning now to FIG. 2 which is a view along line 2—2 of FIG. 1, certain components of the present invention will be seen which are not shown in the partial section elevation shown in FIG. 1. In FIG. 2, plunger 13 is shown engaging a snap fastener 14 in the plunger track or delivery track 30. In its stroke, plunger 13 will move a snap fastener to position 14a where it is located in a nest and is ready to be sealed to film 29. Film 29 is positioned over the snap fastener in position 14a; or, stated another way, snap fastener 14a is positioned in an upright position beneath film 29. To arrive in the position of snap fastener 14, the snap fasteners move along fastener feed track 31 which is flat and level being the same elevation as plunger track 30. However, the feed track 32 is inclined upwardly and is vibrationally driven as it receives the properly oriented snap fasteners from vibratory hopper 33. The hopper and track used in the preferred embodiment are the vibratory feeders sold under the trademark "Vibro Block" by Arthur G. Russell Co., Inc. of Bristol, Connecticut. These feeders take the snap fasteners which are randomly put into the hopper, orient them and deliver them down track 32 in an upright position with the projection of the snap fastener being upright. The projection is normally either the stud or the socket of the snap fastener.

Also shown in FIG. 2 is the working surface 13 and the adjustment mechanism 34 which can adjust the position of the plunger track 30. It is understood, of course, that the plan view shown in FIG. 2 is one-half of the preferred embodiment, and is used to put one of the pair of snap fasteners onto the film. The other half of the preferred embodiment is a mirror image of FIG. 2 being displace only so that the cooperating snap fastener can be placed properly in position on the film.

In FIGS. 3, 4, 5, and 6, the sealing and severing head assembly 25 and its component parts are shown. Looking first at FIG. 3, a sectional elevational side view of the sealing and severing head assembly 25, housing members 37 and 38 comprise the main support or body for the assembly 25. Centrally located within housing 38 is the circular knife or severing means 40. This knife 40 is tubular and hollow and is shown in greater detail in FIG. 6. A central duct or passageway 50 communicates with the vacuum port 51 so that a vacuum can be drawn through the knife and remove the slugs of film which are cut.

Figure 3:
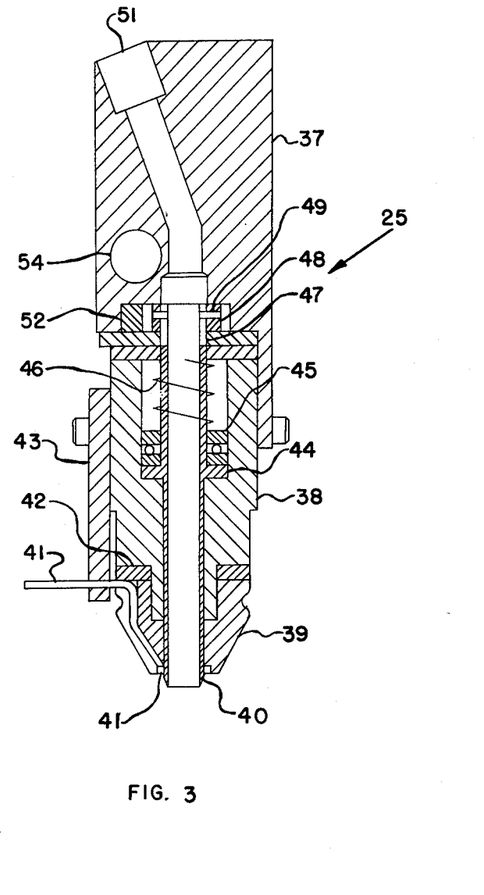
FIG. 3 is a section view of a side elevation of the sealing and severing head of the present invention.

Still referring to FIG. 3, circular projection 44 which encircles the knife 40 is shown resting in the bottom of the cavity in housing 38. Immediately above and resting on the projection 44 is bearing assembly 45 to which is connected spring 46 which is connected at its upper end to the top of the cavity. Thus, upon descent the knife 40 can move upwardly inside the housing so that the heating elements 41 can contact the film. This will be explained in greater detail hereinafter.

Figure 4:
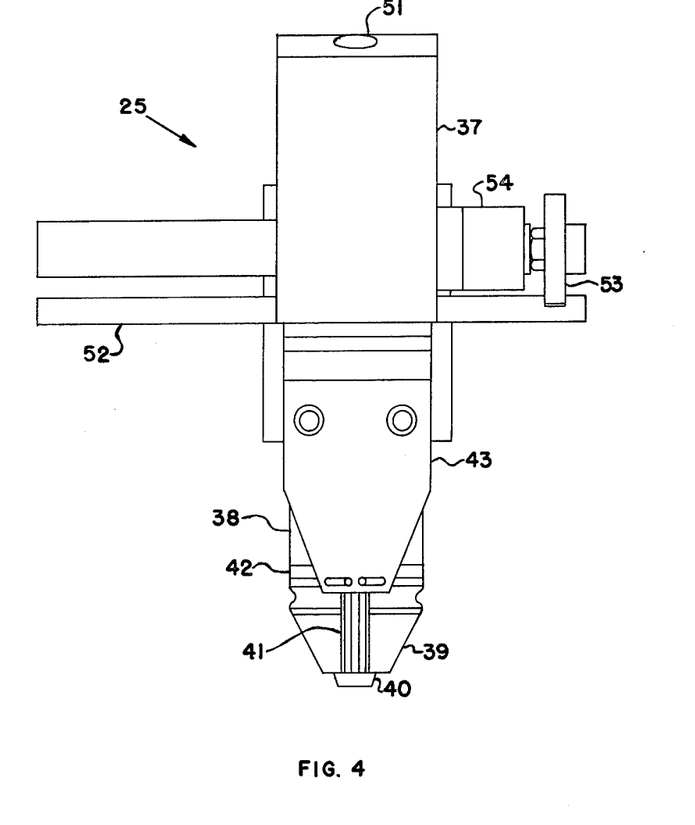
FIG. 4 is a rear elevation view of the sealing and severing head.
Figure 5:
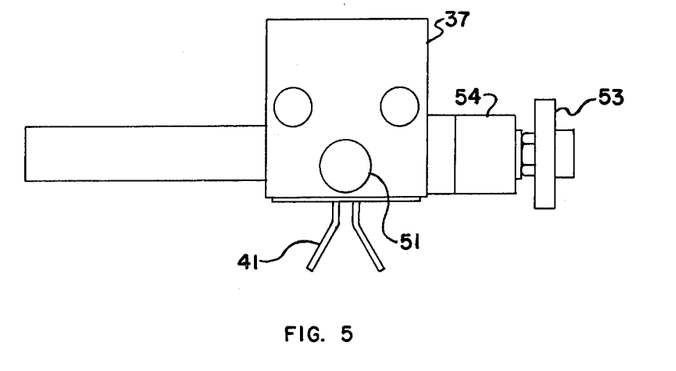
FIG. 5 is a top plan view of the sealing and severing head.
Figure 6:
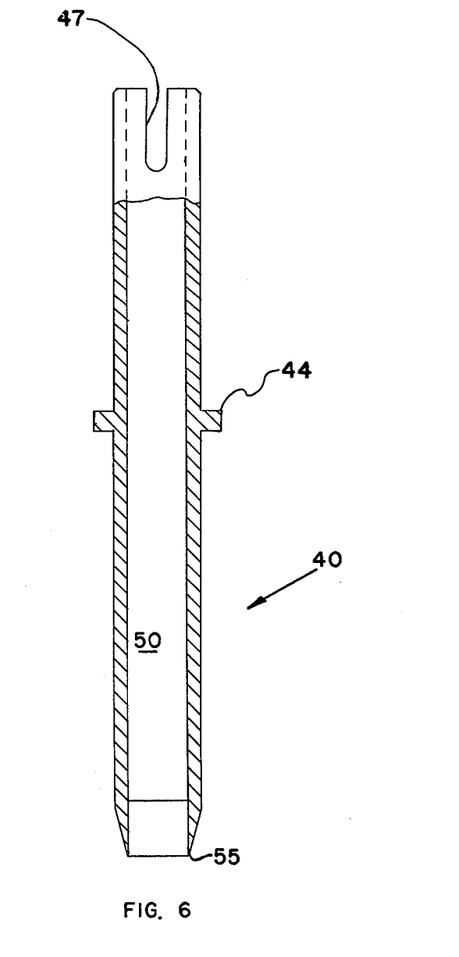
FIG. 6 is a sectional view of the severing means of the present invention.

Referring now to FIGS. 4 and 5, pneumatic cylinder 54 is shown being mounted perpendicularly to the circular knife 40 and the pneumatic cylinder 54 is connected through member 53 to rack 52. Also shown in FIG. 4 are electrode holder 43 for the electrodes of heating element 41 and insulating piece 42. The tip 39 or lower section of the housing is also shown here.

Figure 7:
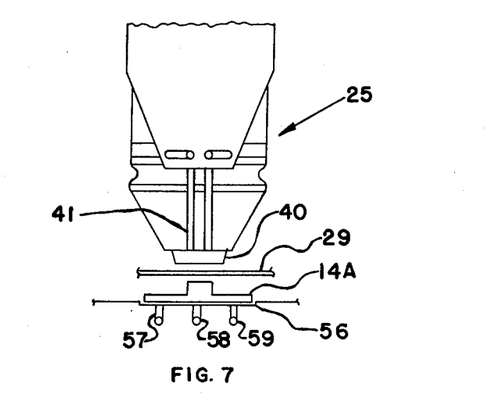
FIG. 7 is a schematic representation showing the sealing head, film, and snap fastener in the nest, all of these elements being in their relative positions.
Figure 8:
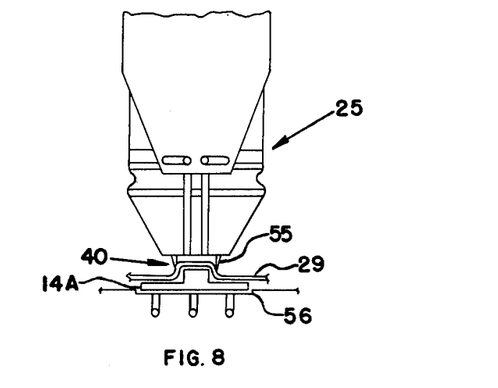
FIG. 8 is the same view as FIG. 7 except that the extension of the severing means is shown in section as it stretches the film over the snap fastener in the nest.
Figure 9:
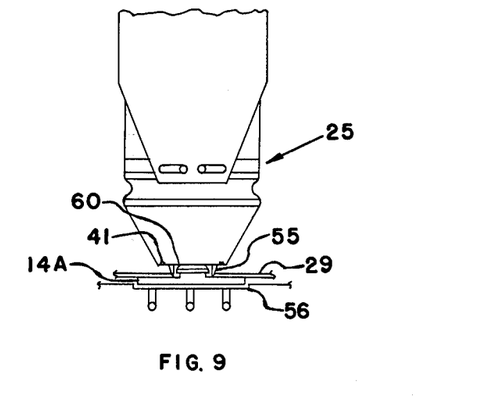
FIG. 9 is the same view as FIG. 8 except that the aperture has now been formed in the film by the severing means.

In FIG. 3, the knife drive gear or pinion 48 is shown in section. The pinion 48 is annularly shaped and surrounds the upper portion of the knife 40. The gear teeth are on the outer surface of the pinion and interengage the teeth on rack 52. Two opposed dowel pins 48a extend inwardly from the inner surface of the pinion and fit into slot 47 of the knife 40. Slot 47 is better seen in FIG. 6. The dowel pin and slot arrangement allow the knife blade to move upwardly without losing its driving engagement with the pinion. The length of the rack is sufficient to completely rotate the knife and its sharp cutting edge 55 will easily cut or form an aperture in film stretched over the stud or socket of a snap fastener by the initial contact with the knife. Referring next to FIG. 7, 8, and 9, the sequence of events as the aperture is formed in the supporting film and sealed to the snap fastener will be described. In FIG. 7 a snap fastener 14a is shown sitting in nest 56. For further stability within the nest, vacuum lines 57, 58, and 59 are provided to draw a vacuum against the base of snap fastener 14a and hold it in a stable position. As is understood from the description in the paragraphs above, snap fastener 14a was delivered to the nest 56 by the action of plunger 13.

In FIG. 7 the strip of film 29 is shown positioned above snap fastener 14a and above the snap fastener is the cutting or severing mechanism 40 whose tip extends below the housing of the sealing and severing head assembly 25. The extension of electrodes 41 is also shown.

In FIG. 8 the tip of severing means 40 is shown in sections so that cutting edge 55 can be clearly seen. Cutting edge 55 first stretches the film across the projection on fastener 14a as shown as head assembly 25 descends toward the bottom of its stroke. At this position, the pneumatic cylinder 54 is actuated thus rotating the severing means 40 to cut or form the aperture in the film as shown in FIG. 9. The cutting operation leaves slug 60 momentarily on top of the projection but the vacuum means acting through the hollow severing means 40 will withdraw the slug 60 out of the working area. The actuation of the pneumatic cylinder 54 can be accomplished by a timing cam on cam shaft 16 or an off-on switch can be operated by the motion of rocker arm 22 this being well within the skill of the art.

In FIG. 9 the forming of the aperture has been completed and further descent of head assembly 25 causes the knife edge 55 to be retracted into the housing as the knife edge 55 now contacts the snap fastener 14a. As the knife edge 55 retracts, the electrode or heating element 41 contacts the film 29 around the aperture compressing the film against the snap fastener 14a. The head assembly 25 may dwell as long as 0.3 seconds while the film is pressed against the snap fastener 14a and during this dwell time an electrical impulse is sent to heating element 41. Heating element 41 is preferably nichrome but may be stainless steel. The current and voltage of the electrical impulse will, of course, have to be adjusted to the electrical resistance of the particluar heating element. For the stainless steel element used in the present embodiment, a current of 60 amps at 3 volts will provide a temperature in the range of 450°F to 500°F which is sufficient in the 0.3 seconds dwell time to seal 1 mil polyethylene film to the polyethylene snap fastener.

Figure 10:
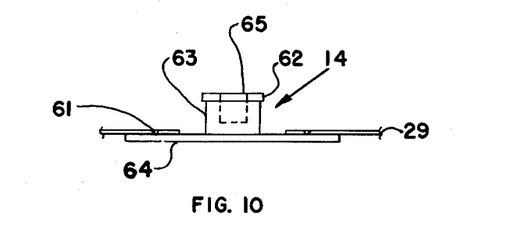
FIG. 10 shows a side view in partial section of a snap fastener sealed to film in accordance with the method of the present invention.
Figure 11:
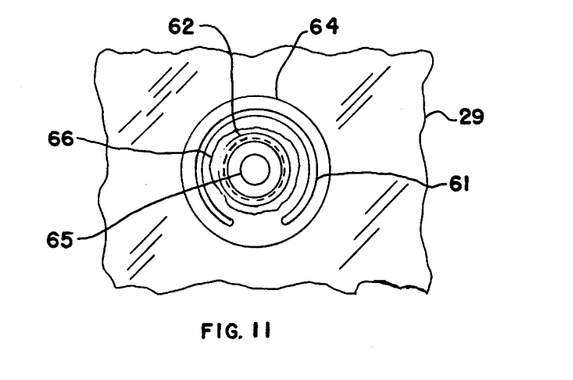
FIG. 11 is a top view of the snap fastener in FIG. 10 showing the circular seal of the film to the snap fastener around the aperture in the film; and, FIG. 12 shows the stud-and-socket arrangement in partial section from a side view of snap fasteners affixed to film according to the method of the present invention.

Continuing now with FIGS. 10 and 11, the appearance of the seal and the manner in which the snap fastener is attached will be described in greater detail. In FIG. 10, snap fastener 14 is shown having base 64 from which cylindrical body or projection 63 rises. The projection or barrel 63 will either be a fastener socket or a fastener stud. In the embodiment shown in FIG. 10, projection 63 is a stud having a locking lip 62 and an interior wall 65. Seal 61 is also shown in FIG. 10. In FIG. 11 a top view is shown of the stud shown in FIG. 10. Here, the circular nature of the seal 61 as it partially surrounds the aperture 66 can be appreciated. This relatively complete sealing around the aperture adheres the snap fasteners securely to the film and leaves few rough edges or nicks from which a tear in the film might propagate.

Figure 12:
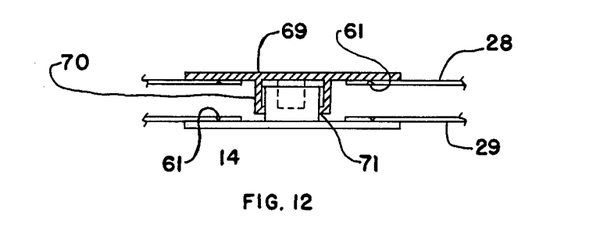

FIG. 12 shows the two snap fastener elements 14 and 69 in a snapped together relationship. The stud or fastener element 14 is locked into the socket element 69 which is shown in section so that the interlocking engagement can be illustrated. The socket element has a locking lip 71 encircling the interior portion of its projection or barrel 70 to securely lock the two elements together. The seal 61 for the socket element 69 would have the same appearance as shown in FIG. 11.

Returning briefly to FIG. 1, the edge view of a folded piece of film 27 is shown. The lower part of the fold 29 is receiving a snap fastener in the position as shown in FIG. 1. This portion will be the fold over flap for a plastic display bag. The bag body portion is represented by the upper fold 28. As shown in FIG. 1, the film is moving into the plane of the sheet of the drawing. In FIG. 2 the folded relationship can be better appreciated. Here the film 27 is moving from right to left and the fold 29 which is receiving snap fastener 14a is shown, and lying over it is shown the fold 28 which forms the front wall of the bag portion. In the mirror image half of the embodiment which is to the left of FIG. 2. The nest and feed track go under fold 28 to place a snap fastener there. The fasteners are, of course, in exact vertical alignment. After having received the snap fasteners, the folded film is sealed and severed in vertical lines or along lines transverse to the direction of the travel of the film as shown in FIG. 2. When the film is sealed and severed the flap portion 29 can then be folded over and snapped into the fastener arm bag portion 28 so that a snapping lock a shown in FIG. 12 is accomplished.

In actual operating sequence, the film will be folded and fed as shown in FIGS. 1 and 2 by conventional folding and feeding mechanisms which are not shown. While the film is moved the plunger moves a snap into position. The film is then stopped after traveling a distance which is equivalent to the desired width of a bag. Usually, the film will be printed with advertising indicia and there will be a space between the repeating pattern of the indicia. This space will be transparent and can be sensed by a photo-electric cell which can stop the feeding and folding mechanism. Once the film is stopped, the head assembly descends; and, as the knife blade contacts the film and stretches it over the snap fastener projection, the knife rotates and the head descends further whereupon the heating elements contact the film and press it against the snap fastener. The head dwells for a period of time at the bottom of the stroke to allow the heat sealing to take place during which time the vacuum means acting through the knife blade removes the slug of cut film. Afterwards, the head is retracted and the film moves again. This movement is synchronized with the transverse sealing and severing of the film to make the completed bag.

The snap fasteners and the film are preferably made of compatible, heat sealable, thermoplastic materials such as polyethylene, polypropylene, polyvinyl chloride, or the like. The fasteners may be applied to many different types of supporting films and can even be used to apply snap fasteners to raincoats, shower curtains, canopy material, or generally be used where it is desired to temporarily join together sheet-like portions of material of any size.

I claim:

1. An apparatus for securing a heat-sealable fastener having an upright projection to heat sealable film or the like comprising:
   a. means for positioning a snap fastener beneath said film;
   b. means for stretching said film across said projection;
   c. annular, rotatable knife means for forming an aperture in said film while stretched so that said projection extends therethrough;
   d. means for rotating said knife; and
   e. means for heat sealing said film to said fastener at least partially around said aperture.

2. The apparatus of claim 1 wherein said means for heat sealing includes a circularly shaped electrically resistance heated electrode.

3. An apparatus for forming an aperture in heat-sealable, film-like material and securing said material to a heat-sealable article by a seal made at least partially around said aperture comprising:
   a. a housing;
   b. a tubular, rotatable, elongated, severing means resiliently mounted vertically in said housing, said severing means having a cutting tip extending below said housing;
   c. means for rotating said severing means; and,
   d. heat sealing means at least partially encircling said extended cutting tip whereby upon contact with said material placed over said article rotation of said severing means will form an aperture in said material and upon further movement against said material and article said severing means retracts allowing said sealing means to seal said material to said article.

4. The apparatus of claim 3 wherein said severing means is an open tube communicating at its upper end with vacuum means to remove the slugs of film material produced when an aperture is formed.

5. The apparatus of claim 3 wherein the means for rotating said severing means comprises:
   i. a pneumatic cylinder;
   ii. a rack mounted perpendicularly to said tubular severing means, said rack being reciprocally driven by said pneumatic cylinder;
   iii. a longitudinal slot in said severing means;
   iv. an annular pinion positioned around said severing means, said pinion having a dowel pin disposed to slide within said slot, the gear teeth of said pinion engaging the teeth of said rack whereby movement of said rack by the pneumatic cylinder will rotate said severing means by means of said pinion and said pin.

6. The apparatus of claim 5 wherein:
   A. said housing is provided with an internal cavity;
   B. said severing means have a ring-like projection intermediate its length, said projection being adapted to rest on the bottom of said cavity in its original position thereby limiting downward motion of said severing means;
   C. bearing means encircling said severing means, said bearing means resting on said projection; and,
   D. spring means for returning said severing means to its original position after displacement, the lower portion of said spring means contacting said bearing means and the upper portion contacting the top of said cavity.

7. The apparatus of claim 6 wherein said means for heat sealing includes a circularly shaped electrically resistance heated electrode located on the bottom exterior surface of said housing.

8. An apparatus for securing a thermoplastic snap fastener having an upright projection to a thermoplastic film comprising:
   a. means for positioning a snap fastener in upright position beneath said film;
   b. a sealing and severing head assembly mounted for vertical reciprocal motion comprising:
      i. a housing;
      ii. a tubular, rotatable, severing means resiliently mounted in said housing, said severing means having a cutting tip extending below said housing;
      iii. means for rotating said severing means;
      iv. sealing means at least partially encircling said extended cutting tip; and
   c. means for raising and lowering said head assembly into and out of contact with said film with said fastener positioned therebeneath whereby upon lowering said head assembly said cutting tip will stretch said film across said projection, rotation of the severing means will cut an aperture in said film, and upon further descent of said head assembly said sealing means will seal said film to said fastener at least partially around said aperture.

9. The apparatus of claim 8 including vacuum means acting through said tubular severing means to remove a slug of film produced when said aperture is formed.

10. An apparatus for securing a thermoplastic snap fastener having an upright projection to a thermoplastic film comprising:
   a. a feed track for receiving said fastener in an upright position;
   b. a delivery track for receiving said fastener from said feed track;
   c. a plunger for advancing said fastener along said delivery track;
   d. a nest for positioning said fastener at the exit of said delivery track;
   e. a sealing and severing head assembly mounted for vertical reciprocal motion above said nest;
   f. a circular knife resiliently mounted for rotary motion in said head assembly, said knife being hollow with a duct extending through its vertical height and said knife being positioned with its circular cutting edge extending below said head assembly;
   g. means for rotating said knife;
   h. a circularly-shaped heater element located on the bottom of said head assembly, said heater at least partially encircling the extension of said knife;
   i. rocker arm means for moving said head assembly in vertical reciprocal motion into and out of contact with a snap fastener in said nest;
   j. a camshaft;
   k. means for driving said camshaft;
   l. a plurality of cams on said camshaft including first and second cams with first and second cam followers associated therewith;
   m. a plunger driving arm, return spring, and connecting rod, said arm being pivotally mounted at one end with the other end being connected to said plunger through said connecting rod, said plunger having the first cam follower disposed intermediate its length, said first cam follower being contacted by the first of said cams, said driving arm and said first cam follower being held against said first cam by said driving arm return spring whereby when said camshaft is rotated said cam will cause said driving arm and connecting rod to move said plunger away from said nest, and said return spring will cause said plunger to move toward said nest upon further rotation of said camshaft;

n. a rocker arm and spring, said rocker arm being connected at one end to vertically reciprocate said head assembly and having the second cam follower at its other end, said second cam follower contacting the second of said cams and said second cam follower being held against said second cam by said rocker arm spring whereby rotation of said camshaft will cause the second cam to move said rocker arm and thereby lift said head assembly, and said rocker arm spring will act to lower said head assembly upon further rotation of said camshaft, the first and second cams being so oriented on said camshaft that said plunger will advance after said head assembly has been raised; the lowering of said assembly causing said circular knife to stretch said film across the upright projection of a fastener in said nest;

o. means for actuating said knife rotating means when said head assembly is lowered into contact with said film and fastener in said nest thereby cutting an aperture in said film; and p. electric current supply means for said heater element and means for actuating same when said head assembly is lowered into contact with said film whereby said film is heat sealed to said fastener.

* * * * *